US009078184B2

(12) United States Patent
Cho et al.

(10) Patent No.: US 9,078,184 B2
(45) Date of Patent: Jul. 7, 2015

(54) APPARATUS AND METHOD FOR PERFORMING HANDOVER IN BROADBAND WIRELESS COMMUNICATION SYSTEM

(75) Inventors: Min-Hee Cho, Suwon-si (KR); Jae-Hee Cho, Seoul (KR); Nam-Gi Kim, Suwon-si (KR); Hyoung-Kyu Lim, Seoul (KR); Hyon-Goo Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1627 days.

(21) Appl. No.: 12/053,055

(22) Filed: Mar. 21, 2008

(65) Prior Publication Data

US 2008/0233961 A1 Sep. 25, 2008

(30) Foreign Application Priority Data

Mar. 21, 2007 (KR) .......................... 10-2007-0027503

(51) Int. Cl.
*H04W 4/00* (2009.01)
*H04W 36/06* (2009.01)
*H04W 48/12* (2009.01)
*H04W 88/02* (2009.01)
*H04W 88/08* (2009.01)

(52) U.S. Cl.
CPC .............. *H04W 36/06* (2013.01); *H04W 48/12* (2013.01); *H04W 88/02* (2013.01); *H04W 88/08* (2013.01)

(58) Field of Classification Search
USPC .......................................................... 370/331
See application file for complete search history.

(56) References Cited

U.S. PATENT DOCUMENTS

| 7,496,364 | B2 * | 2/2009 | Hoghooghi et al. .......... 455/436 |
| 7,606,200 | B2 * | 10/2009 | Kwak et al. .................. 370/331 |
| 7,715,842 | B2 * | 5/2010 | Kim et al. ..................... 455/436 |
| 7,738,871 | B2 * | 6/2010 | Olvera-Hernandez et al. ............................. 455/436 |
| 7,792,081 | B2 * | 9/2010 | Kim et al. ..................... 370/331 |
| 2007/0005675 | A1 * | 1/2007 | Ginzburg et al. ............. 708/523 |
| 2008/0039090 | A1 * | 2/2008 | Jin et al. ....................... 455/436 |
| 2008/0051085 | A1 * | 2/2008 | Ganton ....................... 455/435.2 |

FOREIGN PATENT DOCUMENTS

| KR | 1020050116497 | 12/2005 |
| KR | 20-0427039 | 9/2006 |
| KR | 1020060110573 | 10/2006 |
| KR | 1020070021563 | 2/2007 |
| WO | WO 2006073225 A2 * | 7/2006 |

* cited by examiner

*Primary Examiner* — Chirag Shah
*Assistant Examiner* — Majid Esmaeilian
(74) *Attorney, Agent, or Firm* — The Farrell Law Firm, P.C.

(57) ABSTRACT

An apparatus and method for performing handover in a broadband wireless communication system are provided. A communication method includes broadcasting, by a Base Station (BS), a neighbor advertisement message including neighbor cell information through each Frequency Allocation (FA); analyzing the neighbor cell advertise message by a plurality of Media Access Control (MAC) processors of an Mobile Station (MS) to obtain FA configuration information of each neighbor cell; independently determining handover by the MAC processors of the MS; generating the start of handover by one MAC which first determines handover; and determining a handover target by the remaining MAC processors so that handover is performed to different FAs of the same BS of the MAC processor which generates the start of handover by using the FA configuration information of each neighbor cell.

27 Claims, 7 Drawing Sheets

FIG.7

# APPARATUS AND METHOD FOR PERFORMING HANDOVER IN BROADBAND WIRELESS COMMUNICATION SYSTEM

PRIORITY

This application claims priority under 35 U.S.C. §119(a) to a Korean patent application filed in the Korean Intellectual Property Office on Mar. 21, 2007 and assigned Ser. No. 2007-27503, the entire disclosure of which is incorporated herein by reference.

BACKGROUND OF THE INVENTION

1. Field of the Invention

The present invention relates generally to an apparatus and method for performing handover in a broadband wireless communication system, and in particular, to an apparatus and method for performing handover by a Mobile Station (MS) having a plurality of Media Access Control (MAC) addresses.

2. Description of the Related Art

Today, many wireless communication techniques are being proposed to achieve a high-speed mobile communication. Among them, an Orthogonal Frequency Division Multiplexing (OFDM) scheme is accepted as one of the most promising next generation wireless communication techniques. The OFDM scheme is expected to be widely used as a future wireless communication technique, and is currently used as a standard in the Institute of Electrical and Electronics Engineers (IEEE) 802.16-based Wireless Metropolitan Area Network (WMAN) known as the 3.5 Generation technology.

Meanwhile, the standard or the like is being modified so that a communication system is evolved to provide a high-speed data service in comparison with a legacy system or to address an implementation issue. In such a system evolution process, various systems may be present together in the same area according to a compatibility level with respect to the legacy system. For example, a new system further evolved from the legacy system may be installed in an area where an IEEE 802.16e system is installed. In this case, the new system has to be able to provide a service not only to a legacy Mobile Station (MS) but also to a new MS.

At present, an OFDM-base broadband wireless communication system has a structure that supports only an MS, which uses a single bandwidth through one Frequency Allocation (FA). Therefore, in order to support a new MS using a wider bandwidth, which will be developed in the future, the FA used in the system needs to be changed to a new FA having a suitable bandwidth corresponding to the wider bandwidth. However, when the FA changes, the system cannot provide a service to a legacy MS, which uses a narrow bandwidth. Therefore, there is a problem that all legacy MSs have to be replaced while changing the FA used in the system. Accordingly, there is a need for a method which can support both the legacy MS, which uses the narrow bandwidth and the new MS, which uses the wide bandwidth.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for supporting all Mobile Stations (MSs) each using different bandwidths in a broadband wireless communication system.

Another aspect of the present invention is to provide an apparatus and method for simultaneously using Frequency Allocations (FAs) each having fixed bandwidths in a broadband wireless communication system.

Another aspect of the present invention is to provide an apparatus and method for performing handover for an MS using multiple FAs in a broadband wireless communication system.

Another aspect of the present invention is to provide an apparatus and method in which an MS using multiple FAs performs handover to different FAs of the same cell in a broadband wireless communication system.

Another aspect of the present invention is to provide an apparatus and method for providing multi-FA information of a cell to an MS in a broadband wireless communication system.

In accordance with an aspect of the present invention, an MS apparatus in a broadband wireless communication system having MSs each using different bandwidths is provided. The apparatus includes a multi-FA controller for controlling a plurality of Media Access Control (MAC) processors to perform handover to different FAs of the same Base Station (BS); a first MAC processor for reporting the start of handover to the multi-FA controller when handover is determined; and a second MAC processor for determining a handover target so that handover is performed to the different FAs of the same BS of the first MAC processor under the control of the multi-FA controller.

In accordance with another aspect of the present invention, a BS apparatus in a broadband wireless communication system having MSs each using different bandwidths by the use of frequency overlay is provided. The apparatus includes a plurality of MAC processors, each having different MAC addresses, for generating a neighbor advertisement message including FA configuration information of a neighbor cell; a plurality of communication units, one-to-one corresponding to the MAC processors and using different FAs, for broadcasting the neighbor advertisement message to the MSs; and a multi-FA controller for mapping and managing a plurality of MAC addresses of an MS whose connection is established to two or more of the MAC processors.

In accordance with another aspect of the present invention, a communication method of an MS in a broadband wireless communication system having MSs each using different bandwidths is provided. The method includes determining by a plurality of MAC processors to perform handover independently from one another; generating the start of handover by one MAC processor which first determines handover; and determining a handover target by the remaining MAC processors so that handover is performed to different FAs of the same BS of the MAC processor which generates the start of handover.

In accordance with another aspect of the present invention, a communication method in a broadband wireless communication system having MSs each using different bandwidths by the use of frequency overlay is provided. The method includes broadcasting, by a BS, a neighbor advertisement message including neighbor cell information through each FA; analyzing the neighbor cell advertise message by a plurality of MAC processors of an MS to obtain FA configuration information of each neighbor cell; determining handover by the MAC processors of the MS independently from one another; reporting the start of handover by one MAC processor which first determines handover among the MAC processors of the MS; and determining a handover target by the remaining MAC processors of the MS so that handover is performed to different FAs of the same BS of the MAC processor which reports the start of handover by using the FA configuration information of each neighbor cell.

In accordance with another aspect of the present invention, a communication method of a BS in a broadband wireless communication system having MSs each using different bandwidths by the use of frequency overlay is provided. The method includes generating, by each of a plurality of MAC processors, a neighbor advertisement message including FA information of a neighbor cell; broadcasting the generated neighbor advertisement message through a corresponding FA; and mapping and managing a plurality of MAC addresses of an MS whose connection is established to two or more of the MACs.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

Hereinafter, a technique of the present invention will be described which supports all Mobile Stations (MSs) each using different bandwidths in a broadband wireless communication system. In particular, the present invention provides a method in which, when a new MS using a wide bandwidth performs communication by using multiple Frequency Allocations (FAs), the new MS performs handover to different FAs of the same cell.

In the following descriptions, an Orthogonal Frequency Division Multiplexing (OFDM)-based wireless communication system will be described as an example. However, the present invention may also apply to other communication systems using a different access scheme such as Code Division Multiple Access (CDMA).

Figure 1A:
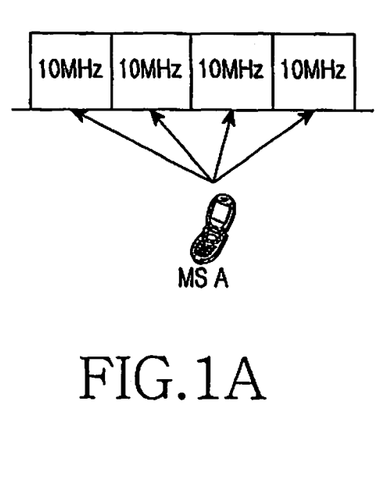
FIGS. 1A through 1C illustrate bandwidth changing processes in a broadband wireless communication system.
Figure 1B:
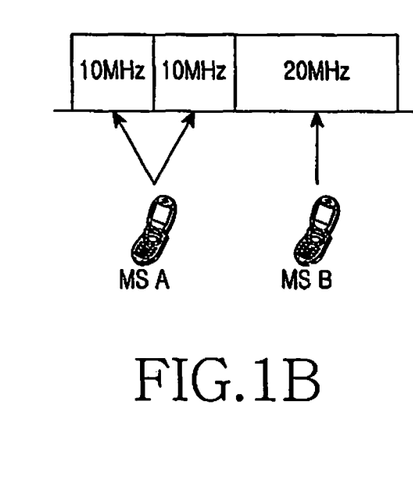
Figure 1C:
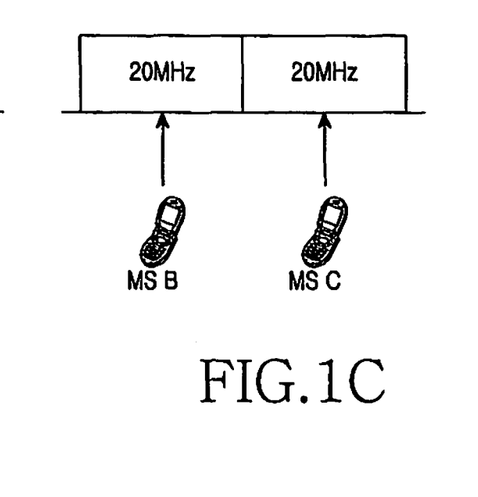

FIGS. 1A through 1C illustrate a bandwidth changing process in a broadband wireless communication system. In FIGS. 1A through 2C, an MS A is a legacy MS using a narrow bandwidth, and an MS B and an MS C are new MSs using a wide bandwidth.

FIG. 1A shows an example of bandwidth usage of a legacy system. Since the legacy MS A supports a bandwidth of 10 MHz, the system uses the entire bandwidth of 40 MHz by dividing it into four bandwidths of 10 MHz. Therefore, the legacy MS A can perform communication by using any one of the four bandwidths of 10 MHz.

FIG. 1B shows an example of bandwidth usage of an interim system. To provide services both to the legacy MS A supporting a bandwidth of 10 MHz and the new MS B supporting a bandwidth of 20 MHz, the system uses the entire bandwidth of 40 MHz by dividing it into two bandwidths of 10 MHz and one bandwidth of 20 MHz. Therefore, the legacy MS A can communicate using either one of the two bandwidths of 10 MHz, and the new MS B can communicate using the bandwidth of 20 MHz.

FIG. 1C shows an example of bandwidth usage of a future system. Since every MS uses a bandwidth of 20 MHz in the future, the future system uses the entire bandwidth of 40 MHz by dividing it into two bandwidths of 20 MHz. Therefore, the new MSs B and C can perform communication by using either one of the two bandwidths of 20 MHz.

Figure 2A:
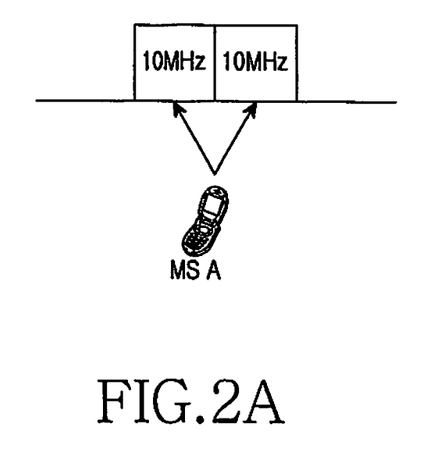
FIGS. 2A through 2C illustrate bandwidth changing processes in a broadband wireless communication system.
Figure 2B:
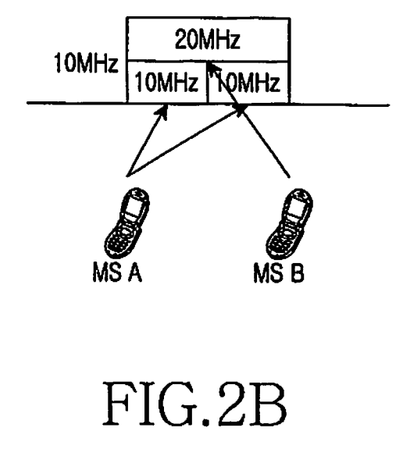
Figure 2C:
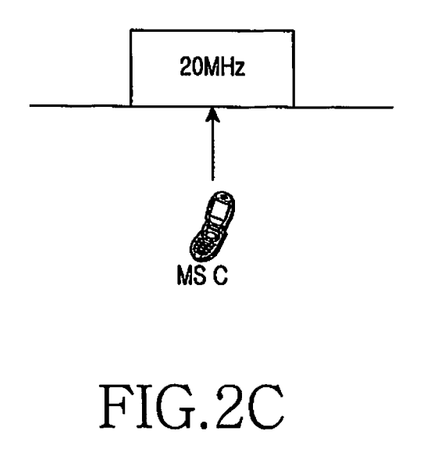

FIGS. 2A through 2C illustrate other examples of a bandwidth changing process in a broadband wireless communication system. In particular, unlike FIG. 1 described above, FIG. 2 shows an example of bandwidth usage at an available bandwidth of 20 MHz. In FIGS. 2A through 2C, an MS A is a legacy MS using a narrow bandwidth, and an MS B and an MS C are new MSs using a wide bandwidth.

FIG. 2A shows another example of bandwidth usage of a legacy system. Since the legacy MS A supports a bandwidth of 10 MHz, the system uses the entire bandwidth of 20 MHz by dividing it into two bandwidths of 10 MHz. Therefore, the legacy MS A can perform communication by using either one of the two bandwidths of 10 MHz.

FIG. 2B shows another example of bandwidth usage of an interim system. To provide services both to the legacy MS A supporting a bandwidth of 10 MHz and the new MS B supporting a bandwidth of 20 MHz, the system first divides the entire bandwidth of 20 MHz into two bandwidths of 10 MHz. Then, the bandwidth of 20 MHz is frequency-overlaid on the two FAs of 10 MHz. Therefore, the legacy MS A can perform communication by using either one of the two FAs, and the new MS B can perform communication by simultaneously using the two FAs.

FIG. 2C shows another example of bandwidth usage of a future system. Since every MS uses a bandwidth of 20 MHz in the future, the future system uses the entire bandwidth of 20 MHz only for a new MS. That is, the new MS C can communicate using the bandwidth of 20 MHz.

In the descriptions of FIGS. 1A through 1C and FIGS. 2A through 2C, the new MS B of the interim system and the MS C of the future system are distinctively depicted because different standards may be used even if the same bandwidth is supported.

The present invention relates to the interim system described in FIG. 2B. As shown in FIG. 2B, when the system supports both the legacy MS and the new MS by using frequency overlay, a smaller bandwidth is required for the legacy MS and the new MS. Therefore, the present invention is further effective in terms of a frequency usage.

Figure 3:
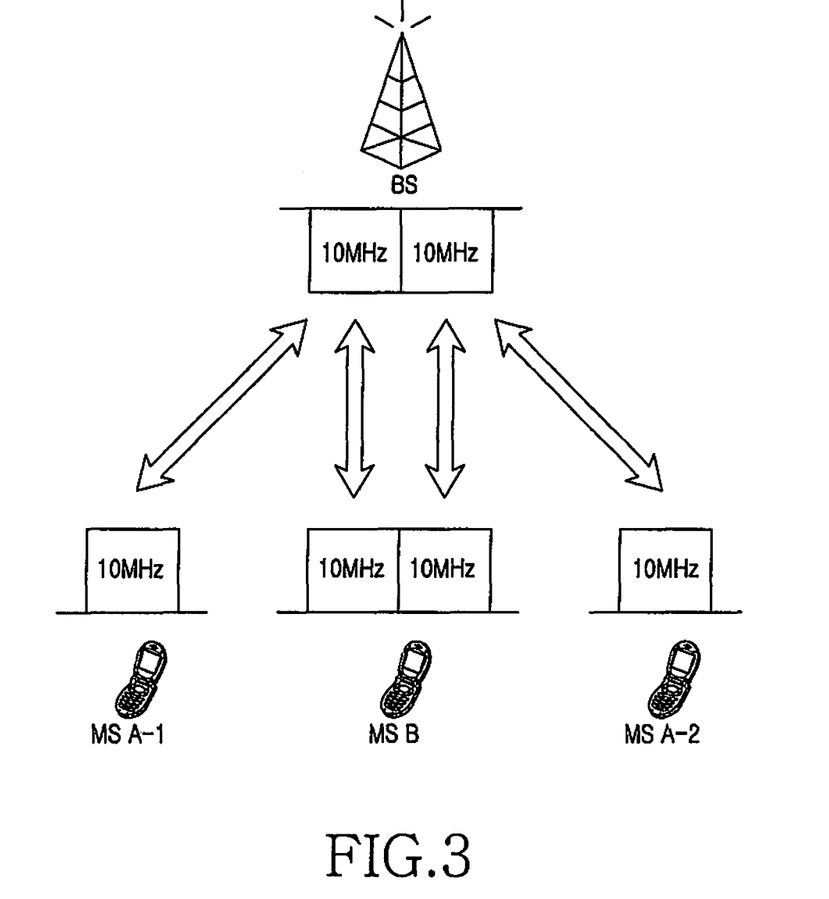
FIG. 3 illustrates a bandwidth usage when frequency overlay is used in a broadband wireless communication system according to the present invention.

FIG. 3 illustrates a bandwidth usage when frequency overlay is used in a broadband wireless communication system according to the present invention.

Referring to FIG. 3, a Base Station (BS) uses two FAs (i.e., FA#1 and FA#2) each having a bandwidth of 10 MHz. Although it is assumed that the number of FAs is two for convenience, the BS may support at least two or more FAs. An MS A-1 is a legacy MS, and performs communication by using only one FA having a bandwidth of 10 MHz. An MS B is a new MS, and performs communication by simultaneously using two FAs each having a bandwidth of 10 MHz. Connections between the BS and the MS B are separately established for the respective FAs. That is, the MS B maintains two connections through the two FAs, and performs communication by using a bandwidth of 20 MHz. As such, by using frequency overlay, the BS can provide a service simultaneously to the new MS and the legacy MS. In addition, since the two FAs are independently managed, the MS B may optionally communicate using only one FA similarly to the legacy MS.

To operate the two FAs in an independent manner, the BS and the MSs may communicate using an independent Media Access Control (MAC) address for each FA. That is, two MACs independently manage and operate network entry, context (e.g., CID, AK ID, SA ID, etc.), handover signaling, and so on. When the two MACs operate by using the different MAC addresses, modification of a standard can be minimized. In addition, a plurality of FAs for the multi-FA communication have to share one Internet Protocol (IP) address since one MS is recognized by its superordinate layer even when multiple FAs are used.

Figure 4:
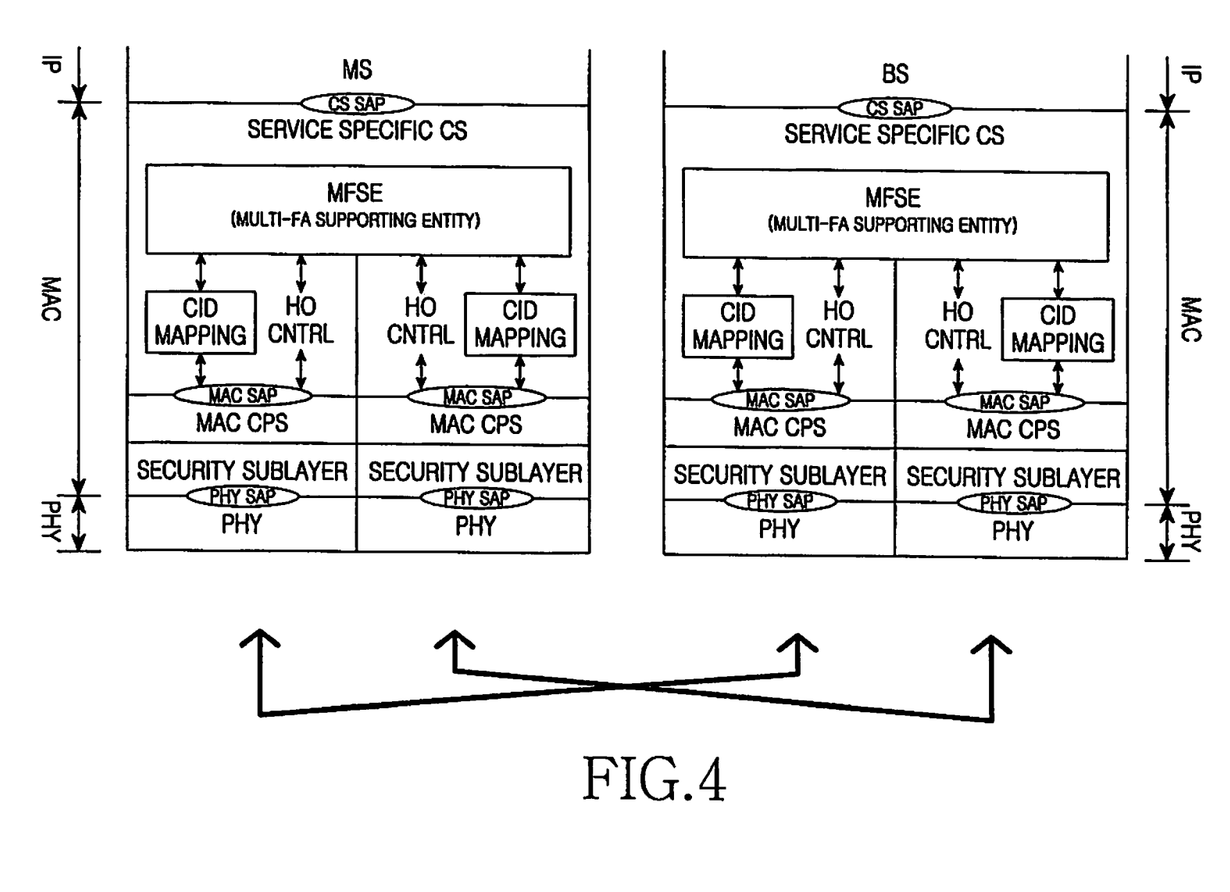
FIG. 4 illustrates a protocol stack configuration for supporting multiple Frequency Allocations (FAs) according to the present invention.

FIG. 4 illustrates a protocol stack configuration for supporting multiple FAs according to the present invention.

Referring to FIG. 4, the protocol stack configuration for supporting the multi-FA includes a PHYsical (PHY) layer and a MAC layer. The MAC layer includes a security sublayer, an MAC-Common Part Sublayer (CPS), and a Convergence Sublayer (CS). Basically, two PHY layers and two MAC layers exit to support two FAs. A Multi-FA Supporting Entity (MFSE) is included in the CS to coordinate multiple FAs. The location of the MFSE is depicted in the figure only as an example, and thus the MFSE may exist either in another layer (e.g., IP layer) or in an additional layer (or sublayer).

The CS converts a service protocol of digital audio/video multicast, digital telephone, and Internet access to conform to an MAC protocol. Further, the CS converts an IP packet into an MAC Service Data Unit (SDU) having a specific Connection ID (CID) and delivers the MAC SDU to the MAC-CPS, and also converts the MAC SDU received from the MAC-CPS into an IP packet and delivers the IP packet to its superordinate layer (e.g., IP layer).

The MAC-CPS controls access to shared wireless media, and also controls flows of data and control signals according to a defined MAC protocol. Further, the MAC-CPS forms an MAC Packet Data Unit (PDU) and a burst by using the MAC SDUs provided from the CS and delivers the burst data to its subordinate layer. Furthermore, the MAC-CPS extracts the MAC-SDUs from the data received from the subordinate layer and delivers the MAC-SDUs to the CS.

The security sublayer performs a security function such as authentication, encryption, and key management.

The PHY layer performs coding, modulation, Inverse Fast Fourier Transform (IFFT), and Radio Frequency (RF) modulation on the burst formed in the MAC-CPS. The PHY layer transmits the resultant data through a wireless link. Further, PHY layer performs RF demodulation, Fast Fourier Transform (FFT), demodulation, and decoding on a signal received through the wireless link, and delivers the resultant data to its superordinate layer.

The MFSE of the present invention controls multi-FA capability negotiation to know if multi-FA is supported between an MS and a BS. Further, the MFSE distributes packets delivered from its superordinate layer through the respective multiple FAs, and gathers and integrates packets delivered from its subordinate layer into one IP address. In this case, the MFSE may perform packet distribution using an IP fragmentation function. In addition, during handover, the MFSE provides control such that multiple FAs connected to the same MS can handover to the same target BS (or cell or sector).

The CID mapping function of the CS, the MAC-CPS function, the function of the security sublayer, and the function of the PHY layer are independently performed. Further, a plurality of MAC-CPSs corresponding to the multiple FAs exchange a handover-related signal with the MFSE in an independent manner.

As such, in order for an MS having two or more MAC addresses to connect to two or more FAs, the followings are required for a network entry process. The two or more MAC addresses of the MS have to be respectively connected to different FAs of the same cell (or sector or BS). For this, two or more MACs need to be coordinated. When connection is attempted by each MAC without coordination, errors may occur in which MACs within the same MS are connected to different cells, or the MACs are connected to the same FA in the same cell.

To avoid such an error, the present invention provides a method in which, after one MAC is connected, information on a different FA in the same sector is obtained and provided to a different MAC so that the different MAC connects to the different FA. The information on the second FA in the same sector may be obtained by using an SS Basic Capability (SBC)-ReSPonse (SBC-RSP) message, a Downlink Channel Descriptor (DCD) message, a NeighBoR-ADVertisement (NBR-ADV) message, etc.

Examples of TLV (Type, Length and Value) included in the DCD message or the SBC-RSP message to deliver information on a different FA of the same BS are shown in Table 1 and Table 2.

TABLE 1

| Type | Length | Value | Scope | Description |
|------|--------|-------|-------|-------------|
| 182 | 5 | Bit #0~31: DL Center Frequency(KHz) Bit #32~39: Preamble Index | SBC-RSP or DCD | For the SCa and OFDMA PHY preamble Index defines the PHY specific preamble. For the OFDM PHY the 5LSB of Preamble Index contain the active DL subchannel index. The 3 MSB of Preamble Index shall be Reserved and set to 0b000. |

TABLE 2

| Type | Length | Value | Scope | Description |
|---|---|---|---|---|
| 183 | 2 | Bit #0~7: FA Index<br>Bit #32~39:<br>Preamble Index | SBC-RSP<br>or DCD | FA Index (Frequency Assignment Index) is present only the FA Index Indicator in PHY Profile ID is set. Otherwise, the neighbor BS has the same FA Index or the center frequency is indicated using the TLV encoded information.<br>The description about Preamble Index is the same as above. |

Since the MS can obtain the different FA information of the same cell by using the NBR-ADV message under the current standard, it is not necessary to define the TLV with respect to the NBR-ADV message.

The BS also has to know a plurality of MAC addresses belonging to the same MS. This information is used when the BS recognizes that different MAC addresses indicate the same MS. The present invention provides a method of exchanging information on a multi-FA capability and different MAC addresses of the same MS through the SBC negotication process.

Table 3 illustrates an example of TLV included in an SS Basic Capability-REQuest (SBC-REQ) message to deliver multi-FA capability information and a different MAC address of the same MS.

TABLE 3

| Type | Length | Value | Scope | Description |
|---|---|---|---|---|
| 180 | 1 | Bit #0: Multi-FA Capability supported<br>Bit #1~#7: Reserved | SBC-REQ<br>SBC-RSP | |
| 181 | 6 | MAC Address | SBC-REQ<br>SBC-RSP | 48-bit MAC address |

Meanwhile, the following requirements are required in a handover operation of an MS when communication is being performed by connecting a plurality of MACs of the MS to different FAs.

In order for the plurality of MACs of the same MS to handover to different FAs of the same cell (or sector or BS), the MS should know FA configuration information of each neighbor cell. Examples of the FA configuration information include the number of FAs, center frequency information (or FA index) on each FA, and a preamble index.

It is assumed in the present invention that FA configuration information of a neighbor cell is obtained by using an NBR-ADV message which is broadcast from each FA. The FA configuration information of the neighbor cell is transmitted according to the following two cases.

In the first case, when physical cell locations are identical even if FAs are different, the same BS_ID can be used. In this case, a different FA of the same cell is distinguished by an FA index. Thus, the MS can distinguish a neighbor cell using a (BS_ID, an FA_index). That is, the MS can evaluate a plurality of FAs included in the same cell by using the (BS_ID, FA index).

In the second case, when FAs are different even if the physical cell locations are identical, a different BS_ID may be used. In this case, the MS can distinguish the neighbor cell using only the BS_ID. However, since the physical cell locations cannot be recognized using only the BS_ID, link information on BS_IDs having different FAs of the same cell should also be transmitted.

When the DCD message includes the information on the different FA of the same BS(the fields of Table 1 or Table 2), DCD information of a neighbor BS is all included in the NBR_ADV message. Thus, information on a different FA of the neighbor BS can be known using the NBR_ADV message.

Alternatively, TLV parameters as shown in Table 4 may be additionally defined to indicate the different FA information of the neighbor BS.

Table 4 shows an example of TLV parameters which are added in the NBR-ADV message to transmit link information on BS_IDs having different FAs of the same cell. In Table 4, a neighbor BS ID having the same physical location ID indicates a BS which has the same physical location and a different FA.

TABLE 4

| Type | Length | Value | Scope |
|---|---|---|---|
| 180 | 4 | Bit #0~7: Same physical location ID<br>Bit #8~31: Neighbor BS ID | NBR-ADV |

In a handover, each MAC of the MS uses FA configuration information regarding on a neighbor cell and obtained from the NBR-ADV message. Each MAC of the MS exchanges a handover signaling message (i.e., HandOver-REQuest/ReSPonse (HO-REQ/RSP)) with a corresponding FA in an independent manner, and thus transmits and receives information required for handover. In addition, each MAC of the MS determines whether to perform handover by referencing to a channel state, the neighbor cell's FA configuration information obtained from the NBR-ADV message, and neighbor cell's service level prediction (SLP) information obtained from the HO-RSP message. When an MAC, which first determines to perform a handover, reports FA information (i.e., target FA) of a target BS to a different MAC, the different MAC determines to perform handover to the different FA of the target BS. That is, the plurality of MACs included in the same MS perform handovers to different FAs of the same BS.

Figure 5:
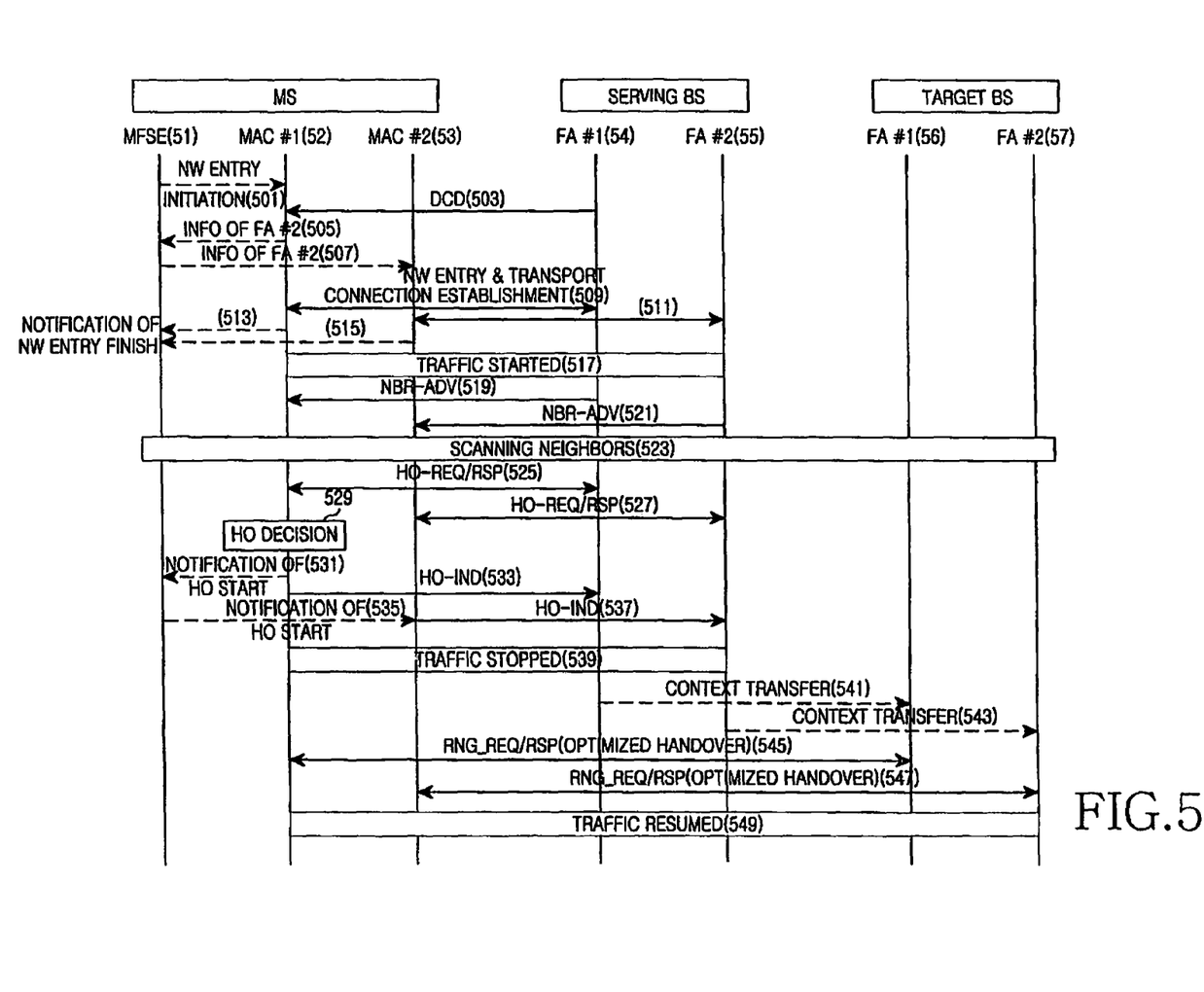
FIG. 5 illustrates a handover process for multi-FA communication in a broadband wireless communication system according to the present invention.

FIG. 5 illustrates a handover process for multi-FA communication in a broadband wireless communication system according to the present invention. Although it is assumed in FIG. 5 that two different MAC units of an MS are connected to a BS using two different FAs o for convenience, the same may also apply when two or more MAC units are connected to the BS using two or more FAs. Herein, a first FA unit 54 comprises a MAC layer and a PHY layer relative to a FA#1. Also, a second FA unit 55 comprises a MAC layer and a PHY layer relative to a FA#2.

Referring to FIG. 5, an MFSE 51 of the MS instructs a first MAC unit 52 to perform initial Network (N/W) entry in step 501. In step 503, the first MAC unit 52 obtains synchronization of a first FA unit 54 of a serving BS, and receives a MAP message and a DCD message. That is, the first MAC unit 52 obtains synchronization using a preamble signal of the first FA unit 54 of the serving BS, evaluates a region of the DCD message by receiving the MAP message, and receives the DCD message at the evaluated region. The DCD message may include information on a different FA (FA#2) of the serving BS. The different FA information may include a DownLink (DL) center frequency (or FA index) of the FA and a preamble index.

In step 505, the first MAC unit 52 of the MS analyzes the DCD message received from the serving BS, and provides information on the different FA information of the serving BS to the MFSE 51. In step 507, the MFSE 51 delivers the different FA information of the serving BS to a second MAC unit 53.

Upon receiving the DCD message, in step 509, the first MAC unit 52 performs a predetermined network entry process to establish a traffic connection. During the network entry process, the first MAC unit 52 transmits an SBC-REQ message to the serving BS. The SBC-REQ message includes information indicating if multi-FA is supported and also includes a different MAC address of the MS. The network entry process includes an initial ranging process, an SBC negotiation process, a registration process, a Private Key Management (PKM) negotiation process, and a Dynamic Service Addition (DSA) process.

Upon obtaining the different FA information of the serving BS, in step 511, the second MAC unit 53 also obtains synchronization of a second FA unit 55 of the serving BS by using the different FA information, and establishes a traffic connection by performing the predetermined network entry process. During the network entry process, the second MAC unit 53 transmits the SBC-REQ message to the serving BS to inform if multi-FA is supported and to inform a different MAC address.

Upon completing the network entry process, in step 513, the first MAC unit 52 delivers an N/W_Entry_Finish signal to the MFSE 51. In step 515, the second MAC unit 53 delivers the N/W_Entry_Finish signal to the MFSE 51.

After establishing the traffic connections respectively by the first MAC unit 52 and the second MAC unit 53, in step 517, the first MAC unit 52 30 exchanges traffic with the first FA unit 54 of the serving BS, and the second MAC unit 53 exchanges traffic with the second FA unit 55 of the serving BS.

In step 519, the first MAC unit 52 receives an NBR-ADV message from the first FA unit 54 of the serving BS and thus obtains neighbor cell information. Likewise, in step 521, the second MAC unit 53 also receives the NBR-ADV message from the second FA unit 55 of the serving BS, and thus obtains neighbor cell information. The first MAC unit 52 and the second MAC unit 53 can obtain FA configuration information on each neighbor cell. That is, the number of FAs included in each neighbor cell, center frequency information (or FA index) on each FA, and a preamble index are obtained.

In step 523, the first MAC unit 52 and the second MAC unit 53 scan neighbor cells according to the obtained neighbor cell information. The first MAC unit 52 and the second MAC unit 53 may have the same or different scanning duration. Basically, since the first MAC unit 52 and the second MAC unit 53 operate independently, scanning is also performed independently.

If the scanning result shows that handover is necessary, in step 525, the first MAC unit 52 exchanges a handover signaling message with the first FA unit 54 of the serving BS. In this case, the first MAC unit 52 transmits a HO-REQ message to the serving BS, and the serving BS transmits a HO-RSP message to the first MAC unit 52. Likewise, if it is determined that the second MAC unit 53 also requires handover, in step 527, the second MAC unit 53 exchanges the handover signaling message to the second FA unit 55 of the serving BS.

According to a reception strength of each neighbor cell and information obtained from the NBR-ADV message and the HO-RSP message, the first MAC unit 52 and the second MAC unit 53 finally determine whether to perform handover in step 529. It is assumed in step 529 that the first MAC unit 52 determines handover before the second MAC unit 53 determines handover.

Upon finally determining handover, in step 531, the first MAC unit 52 reports the start of handover (i.e., HO_start) to the MFSE 51. In this case, the first MAC unit 52 also reports FA information of a target BS to which the first MAC unit 52 performs handover. Further, in step 533, the first MAC unit 52 transmits a HandOver-INDication (HO-IND) message to the first FA unit 54 of the serving BS. When the start of handover is reported to the MFSE 51, in step 535, the MFSE 51 delivers to the second MAC unit 53 the FA information of the target BS to which the first MAC unit 52 performs handover. In step 537, the second MAC unit 53 determines an FA to which the second MAC unit 53 performs handover by using the delivered FA information of the target BS, and transmits the HO-IND message to the second FA unit 55 of the serving BS to release the traffic connection. In this case, the second MAC unit 53 determines to perform handover to the different FA of the same BS of the first MAC unit 52. Further, the HO-IND messages respectively transmitted from the first MAC unit 52 and the second MAC unit 53 have to be transmitted within a few frames. The HO-IND message may include FA information of the target BS to which handover is performed.

Upon receiving the HO-IND message, the first FA unit 54 and the second FA unit 55 of the serving BS release the traffic connection with the MS in step 539. In step 541, the first FA unit 54 of the serving BS delivers context information on the first MAC unit 52 of the MS to a first FA unit 56 of the target BS to which the first MAC unit 52 performs handover. In step 543, the second FA unit 55 of the serving BS also delivers context information on the second MAC unit 53 of the MS to a second FA unit 57 of the target BS to which the second MAC unit 53 performs handover.

In step 545, the first MAC unit 52 of the MS and the first FA unit 56 of the target BS establish a traffic connection by performing an optimized handover process starting from a ranging operation (i.e., RNG-REQ/RSP). In step 547, the second MAC unit 53 of the MS and the second FA unit 57 of the target BS establish a traffic connection by performing the optimized handover process starting from the ranging operation (i.e., RNG-REQ/RSP).

After establishing each traffic connection, in step 549, the first MAC unit 52 exchanges traffic with the first FA unit 56 of the target BS, and the second MAC unit 53 exchanges traffic with the second FA unit 57 of the target BS.

Figure 6:
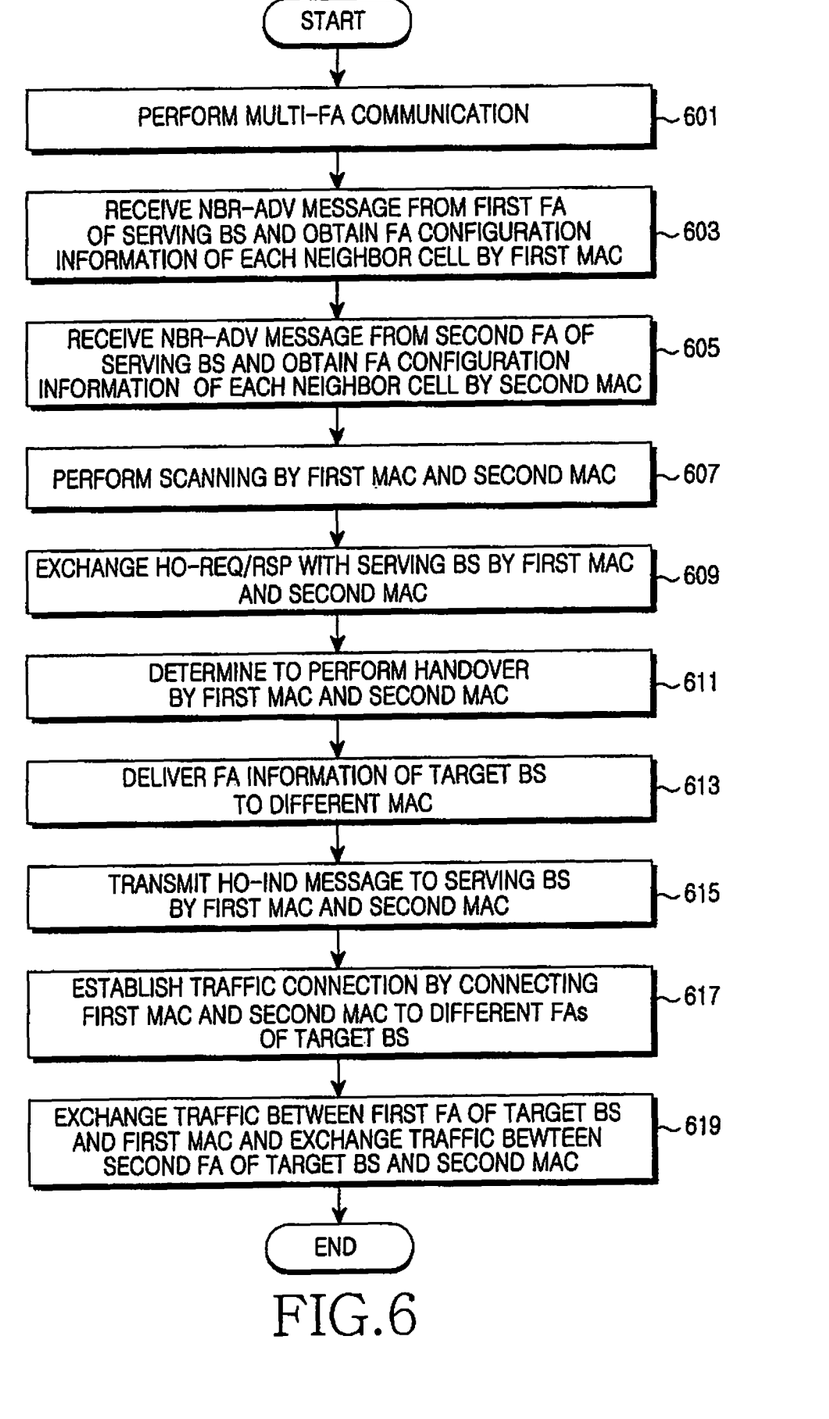
FIG. 6 is a flowchart illustrating an operation of a Mobile Station (MS) supporting multiple FAs in a broadband wireless communication system according to the present invention.

FIG. 6 is a flowchart illustrating an operation of an MS supporting multi-FA communication in a broadband wireless communication system according to the present invention. The operation of the MS of FIG. 6 corresponds to the process of FIG. 5.

In FIG. 6, the first MAC unit 52 and the second MAC unit 53 of the MS connect to different FA units of the serving BS to perform traffic communication in step 601. During the traffic communication, the first MAC unit 52 receives an NBR-ADV message from the first FA unit 54 of the serving BS and then obtains neighbor cell information in step 603. During the traffic communication, the second MAC unit 53 receives the NBR-ADV message from the second FA unit 55 of the serving BS and then obtains neighbor cell information in step 605. Herein, each MAC unit of the MS can obtain FA configuration information of each neighbor cell from the NBR-ADV message. Examples of the FA configuration information include the number of FAs included in a specific neighbor cell, center frequency information (or FA index) on each FA, and a preamble index.

In step 607, the first MAC unit 52 and the second MAC unit 53 scan using the obtained neighbor cell information. Since the first MAC unit 52 and the second MAC unit 53 operate independently, the scanning operation may also be performed independently.

In step 609, the first MAC unit 52 and the second MAC unit 53 determine if handover is necessary according to the scanning results, and, if it is determined that the handover is necessary, exchange a handover signaling message (i.e., HO-REQ/RSP) with the serving BS.

In step 611, the first MAC unit 52 and the second MAC unit 53 each determine whether to perform handover. That is, each MAC unit of the MS finally determines whether to perform handover according to a received signal strength of each neighbor FA and the information obtained from the NBR-ADV message and the HO-RSP message. It is assumed herein that the first MAC unit 52 determines handover before the second MAC unit 53 determines handover.

In step 613, to instruct handover, the MS delivers FA information of the target BS (i.e., the first FA of the target BS), to which the first MAC unit 52 performs handover, to the second MAC unit 53.

In step 615, the first MAC unit 52 and the second MAC unit 53 transmit the HO-IND message to the serving BS and then release a traffic connection. In this case, the second MAC unit 53 determines to perform handover to the different FA of the same BS of the first MAC unit 52. The HO-IND messages respectively transmitted from the first MAC unit 52 and the second MAC unit 53 has to be transmitted within a few frames.

In step 617, the first MAC unit 52 and the second MAC unit 53 each connect to the different FA units of the target BS and then establish traffic connections. That is, the traffic connections are established by performing a handover process starting from a ranging operation (i.e., RNG-REQ/RSP). In step 619, the MS exchanges a first traffic through a connection established between the first MAC unit 52 and the first FA unit 56 of the target BS, and exchanges a second traffic through a connection established between the second MAC unit 53 and the second FA unit 57 of the target BS.

Figure 7:
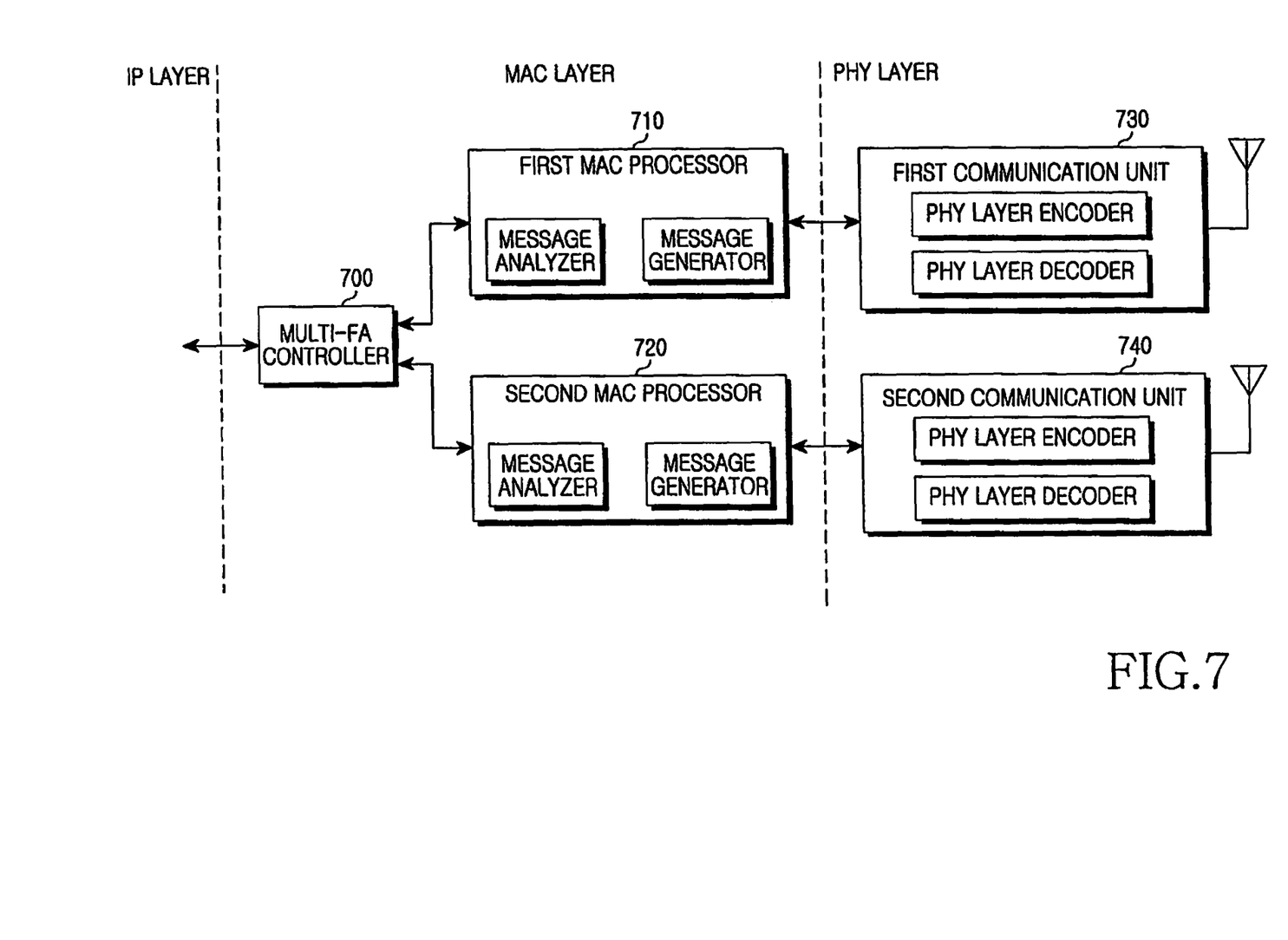
FIG. 7 is a block diagram of an MS (or a Base Station) supporting multiple FAs in a broadband wireless communication system according to the present invention.

As described above with reference to FIG. 4, the BS and the MS have the same structure when protocol stack configurations thereof are the same. Thus, the structures of the BS and the MS will be described hereinafter by taking an apparatus of FIG. 7 as an example. FIG. 7 is a block diagram of an MS (or a BS) supporting multiple FAs in a broadband wireless communication system according to the present invention.

Referring to FIG. 7, under the assumption that the number of FAs is two, the MS includes a multi-FA controller 700, a first MAC processor 710, a second MAC processor 720, a first communication unit 730, and a second communication unit 740. It is assumed herein that the multi-FA control 700, the first MAC processor 710, and the first MAC processor 720 belong to a MAC layer, and the first communication unit 730 and the second communication unit 740 belong to a PHY layer.

A transmission operation will first be explained. The multi-FA controller 700 fragments an MAC SDU transmitted from an IP layer and distributes the fragments to the first MAC processor 710 and the second MAC processor 720 according to a predetermined rule. The distributed fragments may be traffic data for one Service Flow (SF) or traffic data for a plurality of SFs. Further, the multi-FA controller 700 may equally distribute the fragments or may unequally distribute the fragments according to a state (e.g., load state) of each FA. The IP packet may be distributed by fragmentation as described above. Alternatively, however, the IP packet may be distributed in a switching manner without fragmentation.

The first MAC processor 710 gathers the fragments received from the multi-FA controller 700, generates MAC PDUs by appending a header and an error checking code(ie., CRC code), forms frame data by sorting the generated MAC PDUs, and transmits the frame data to the PHY layer. For the same SF, a Connection ID (CID) recorded to the MAC PDU by the first MAC processor 710 may be different from or equal to a CID recorded to the MAC PDU by the second MAC processor 720. Further, the first MAC processor 710 performs a function for generating and analyzing an MAC layer control message (i.e., a signaling message, MAC management message).

The second MAC processor 720 has an MAC address different from that of the first MAC processor 710, and performs the same reception process as the first MAC processor 710.

According to a predetermined rule, the first communication unit 730 performs physical-layer encoding on data received from the corresponding first MAC processor 710. For example, the first communication unit 730 codes and modulates the data received from the first MAC processor 710 according to a predetermined Modulation & Coding Scheme (MCS) level, and OFDM modulates the data using Inverse Fast Fourier Transform (IFFT). Further, the first communication unit 730 converts baseband data into an analog signal, converts the baseband analog signal into an RF signal corresponding to one FA (e.g., first FA) of the two FAs for multi-FA communication, and transmits the RF signal through an antenna. Such a process is provided in consideration of an OFDM system. Thus, when using a CDMA system, the OFDM modulation may be replaced with code spreading modulation.

According to a predetermined rule, the second communication unit 740 performs physical-layer encoding on data received from the corresponding second MAC processor 720. In this case, the second communication unit 740 converts a baseband signal into an RF signal corresponding to the other FA (e.g., second FA) of the two FAs for multi-FA communication, and transmits the RF signal through an antenna.

In a reception operation, the first communication unit 730 performs physical-layer decoding on a signal received through an antenna and then transmits the signal to the corresponding first MAC processor 710. For example, the first communication unit 730 filters a signal received through the antenna to obtain a signal corresponding to the first FA, converts the obtained signal into baseband sample data, performs OFDM demodulation on the sample data, demodulates and decodes the OFDM-demodulated data according to a predetermined MCS level to restores an information bit-steam.

The second communication unit 740 performs physical-layer decoding on a signal received through an antenna, and transmits the signal to the corresponding second MAC processor 720. The second communication unit 740 filters the received signal to obtain a signal corresponding to the second FA, converts the obtained signal into a baseband signal, and delivers the baseband signal to the second MAC processor 720.

The first MAC processor 710 extracts an MAC PDU from data received from the corresponding first communication unit 730, and performs header and error checking on the extracted MAC PDU. In this case, if a control message (i.e., a signaling message) is determined as a result of the header checking, the first MAC processor 710 performs a predetermined process, and if traffic is determined, the first MAC processor 710 performs error checking and provides the error checking result to the multi-FA controller 700. The second MAC processor 720 has an MAC address different from that of the first MAC processor 710, and performs the same reception process as the first MAC processor 710.

The multi-FA controller 700 maps and manages IP addresses obtained through a representative MAC address of a plurality of MAC addresses for multi-FA communication and a plurality of CIDs for multi-FA communication. Thus, the multi-FA controller 700 can integrate MAC PDUs having different CIDs and delivered from the plurality of MAC processes 710 and 720 into one IP address. That is, the multi-FA controller 700 assembles the MAC PDUs having different CIDs into one SDU (i.e., IP packet), and delivers the resultant data to its superordinate layer (e.g., IP layer).

With respect to the operation of the MS, the first MAC processor 710 and the second MAC processor 720 connect to different FAs of the same BS and then perform traffic communication. During the traffic communication, the first MAC processor 710 analyzes an NBR-ADV message received from the first FA of the BS and then obtains neighbor cell information. Further, the first MAC processor 710 performs scanning by using the obtained neighbor cell information, and, if it is determined that handover is necessary, exchanges a handover signaling message with the first FA of the BS. When the handover is finally determined, the first MAC processor 710 reports the start of handover to the multi-FA controller 700. In this case, the first MAC processor 710 also reports FA information of the target BS to which handover is performed.

Likewise, during the traffic communication, the second MAC processor 720 also determines whether to perform handover as described above. When the handover is finally determined, the second MAC processor 720 reports the start of the handover to the multi-FA controller 700.

When the MS performs handover, the multi-FA controller 700 provides control such that the first MAC processor 710 and the second MAC processor 720 can handover to the different FAs of the same cell. That is, the multi-FA controller 700 examines if the start of handover is reported from the first MAC processor 710 and the second MAC processor 720, and, if the start of the handover is reported from any one of the first MAC processor 710 and the second MAC processor 720, instructs the other MAC processor to also perform handover. It is assumed herein that the first MAC processor 710 determines handover before the second MAC processor 720 determines handover. Thus, to instruct handover, the multi-FA controller 700 delivers FA information of the target BS, to which the first MAC processor 710 performs handover, to the second MAC processor 720.

Thereafter, the first MAC processor 710 connects to a specific FA of the target BS to establish a connection, and then exchanges traffic through the established connection. The second MAC processor 720 determines an FA, to which handover is performed, by using the FA information of the target BS received from the multi-FA controller 700, connects to the determined FA to establish a connection, and then exchanges traffic. The second MAC processor 720 determines to handover to a different FA of the same BS of the first MAC processor 710.

With respect to the operation of the BS, the first MAC processor 710 and the second MAC processor 720 have different MAC addresses and independently operate. It is assumed herein that, among the two FAs for multi-FA communication, the first MAC processor 710 and the first communication unit 730 are in association with the first FA, and the second MAC processor 720 and the second communication unit 740 are in association with the second FA.

The first MAC processor 710 generates a message to inform FA configuration information of a neighbor cell to an MS connected to the first FA, and delivers the message to the first communication unit 730. Then, the first communication unit 730 processes the message received from the first MAC processor 710 so that the message has a transmittable format, and then transmits the message. The message including the FA configuration information of the neighbor cell may be an NBR-ADV message, which is broadcast with a periodic interval. The FA configuration information on the neighbor cell may include the number of FAs included in the neighbor cell, center frequency information (or FA index) on each FA, and a preamble index.

Likewise, the second MAC processor 720 generates a message (i.e., NBR-ADV) to inform the FA configuration information of the neighbor cell to an MS connected to the second FA, and delivers the message to the second communication unit 740. Then, the second communication unit 740 processes the message delivered from the second MAC processor 720 so that the message has a transmittable format, and then transmits the message.

The multi-FA controller 700 maps and manages different MAC addresses corresponding to the MS and delivered from the MAC processors 710 and 720. Thus, the BS can manage the different MAC addresses of the same MS. Thus, in the management, the BS may map IP addresses assigned to the MS and a plurality of CIDs assigned to the MS for multi-FA communication.

According to the present invention, an MS using a wide bandwidth is supported by using a frequency overlay scheme in a broadband wireless communication system. Therefore, there is an advantage that the system can effectively support a legacy MS and a new MS in a bandwidth change process. In particular, when an MS supporting multi-FA communication performs handover, different MACs of the MS can handover to different FAs of the same cell (or sector or BS) without collisions.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A mobile station apparatus in a wireless communication system, the apparatus comprising:
   a first Media Access Control (MAC) processor configured to establish a first traffic connection with a first base station at a first Frequency Allocation (FA) of the first base station, to estimate a received signal strength from a first FA of a second base station, and to determine to perform a handover to the first FA of the second base station, based on the estimated received signal strength from the first FA of the second base station; and a second MAC processor configured to, after the first MAC processor establishes the first traffic connection, establish a second traffic connection with the first base station at a second FA of the first base station in a same cell sector, and to determine to perform a handover to a second FA of the second base station, based on the first MAC processor selecting the second base station as a handover target, regardless of a received signal strength from the second FA of the second base station.

2. The apparatus of claim 1, wherein the first MAC processor receives neighbor advertisement messages comprising FA configuration information of neighbor cells.

3. The apparatus of claim 2, wherein the FA configuration information comprises:
a number of FAs included in a corresponding neighbor cell;
center frequency information on each of the FA; and
a preamble index.

4. The apparatus of claim 1, further comprising:
a first communication unit configured to perform physical-layer processing on a signal to be received or transmitted by the first MAC processor; and
a second communication unit configured to perform physical-layer processing on a signal to be received or transmitted by the second MAC processor.

5. The apparatus of claim 1, wherein the first MAC processor transmits multi-FA capability information and a first MAC address to the base station during a network entry process.

6. The apparatus of claim 1, further comprising:
a controller configured to provide information of the handover target, selected by the first MAC processor, to the second MAC processor.

7. A method for a mobile station in a wireless communication system, the method comprising:
performing a first network entry process to establish a first traffic connection with a first base station at a first Frequency Allocation (FA) of the first base station;
performing, after the first traffic connection is established, a second network entry process to establish a second traffic connection with the first base station at a second FA of the first base station in a same cell sector;
estimating a received signal strength from a first FA of a second base station;
determining to perform a handover to the first FA of the second base station, based on the estimated received signal strength from the first FA of the second base station; and
determining to perform a handover to a second FA of the second base station, based on a first MAC processor selecting the second base station as a handover target, regardless of a received signal strength from the second FA of the second base station.

8. The method of claim 7, further comprising:
releasing the traffic connections with the first base station; and
establishing traffic connections with the second base station.

9. The method of claim 8, further comprising:
exchanging traffics through the established traffic connections with the second base station through the different FAs.

10. The method of claim 9, further comprising:
mapping the traffics received through the traffic connections to a single Internet Protocol (IP) address.

11. The method of claim 7, further comprising:
receiving neighbor advertisement messages comprising FA configuration information of neighbor cells.

12. The method of claim 11, wherein the FA configuration information includes a number of FAs included in a corresponding neighbor cell, center frequency information on each FA, and a preamble index.

13. A communication method in a wireless communication system, the method comprising:
performing, by a first base station and a mobile station, a first network entry process to establish a first traffic connection at a first Frequency Allocation (FA) of the first base station;
performing, by the first base station and the mobile station, after the first traffic connection is established, a second network entry process to establish a second traffic connection at a second FA of the first base station in a same cell sector;
broadcasting, by the first base station, a neighbor cell advertisement message for the first FA of the first base station at the first FA and a neighbor cell advertisement message for the second FA of the first base station at the second FA, wherein the neighbor cell advertisement messages includes neighbor cell information;
determining, by the mobile station, to perform a handover to a first FA of a second base station, based on a received signal strength from the first FA of the second base station; and
determining, by the mobile station, to perform a handover to a second FA of the second base station, based on a first MAC processor selecting the second base station as a handover target, regardless of a received signal strength from the second FA of the second base station.

14. The method of claim 13, further comprising:
releasing, by the first base station and the mobile station, the traffic connections; and
establishing, by the second base station and the mobile station, traffic connections.

15. The method of claim 14, further comprising:
exchanging by the second base station and the mobile station, traffic through the established traffic connections at the different FAs.

16. The method of claim 15, further comprising:
mapping, by the second base station and the mobile station, the traffics received through the traffic connections to a single Internet Protocol (IP) address.

17. The method of claim 13, wherein the FA configuration information includes a number of FAs included in a corresponding neighbor cell, center frequency information on each FA, and a preamble index.

18. A base station apparatus in a wireless communication system, the apparatus comprising:
a first Media Access Control (MAC) processor configured to establish a first traffic connection with a mobile station at a first Frequency Allocation (FA) of the base station, and to provide context information on a first MAC processor of the mobile station to a target base station; and
a second MAC processor configured to, after the first MAC processor establishes the first traffic connection, establish a second traffic connection with the mobile station at a second FA of the base station in a same cell sector, and to provide context information on a second MAC processor of the mobile station to the target base station,
wherein the target base station for the first MAC processor of the mobile terminal is determined based on a received signal strength from a first FA of a second base station estimated by the mobile station, and
wherein the target base station for the second MAC processor of the mobile terminal is identical to the target base station for the first MAC processor of the mobile terminal, and is determined based on selecting of the target base station by the first MAC processor of the mobile terminal, regardless of a received signal strength from the second FA of the second base station.

19. The apparatus of claim 18, wherein the first MAC processor transmits a neighbor advertisement message including FA configuration information of neighbor cells.

20. The apparatus of claim 19, wherein the FA configuration information comprises:
   a number of FAs included in a corresponding neighbor cell;
   center frequency information on each of the FAs; and
   a preamble index.

21. The apparatus of claim 19, wherein the first MAC processor receives multi-FA capability information and a first MAC address of the mobile station during a network entry procedure.

22. The apparatus of claim 19, wherein the first MAC processor transmits, to the mobile station, information on a second FA by using any one of a message for performing basic capability negotiation of the mobile station, a message for broadcasting Downlink Channel Descriptor (DCD) information, and a message for broadcasting neighbor base station information.

23. A method for a base station in a wireless communication system, the method comprising:
   performing a first network entry process to establish a first traffic connection with a mobile station at a first Frequency Allocation (FA) of the base station;
   performing, after the first traffic connection is established, a second network entry process to establish a second traffic connection with the mobile station at a second FA of the base station in a same cell sector;
   providing context information on a first MAC processor of the mobile station to a target base station; and
   providing context information on a second MAC processor of the mobile station to the target base station,
   wherein the target base station for the first MAC processor of the mobile terminal is determined based on a received signal strength from a first FA of a second base station estimated by the mobile station, and
   wherein the target base station for the second MAC processor of the mobile terminal is identical to the target base station for the first MAC processor of the mobile terminal, and is determined based on selecting of the target base station by the first MAC processor of the mobile terminal, regardless of a received signal strength from the second FA of the second base station.

24. The method of claim 23, further comprising:
   transmitting a neighbor advertisement message including FA information of neighbor cells.

25. The method of claim 24, wherein the FA configuration information includes the number of FAs included in a corresponding neighbor cell, center frequency information on each FA, and a preamble index.

26. The method of claim 24, further comprising:
   receiving multi-FA capability information and a different MAC address of the mobile station during a network entry procedure.

27. The method of claim 24, further comprising:
   transmitting information on the second FA to the mobile station at the first FA by using any one of a message for performing basic capability negotiation of the mobile station, a message for broadcasting Downlink Channel Descriptor (DCD) information, and a message for broadcasting neighbor base station information.

* * * * *